R. A. HARTMANN.
UNIVERSAL JOINT.
APPLICATION FILED MAR. 10, 1921.
1,424,299. Patented Aug. 1, 1922.
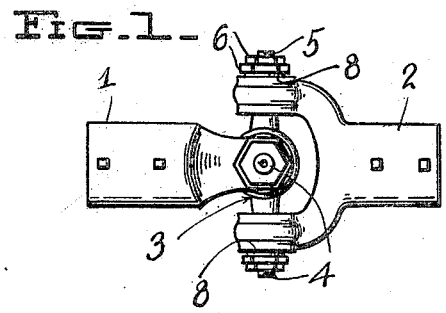
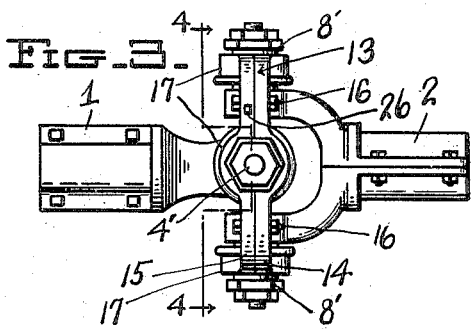
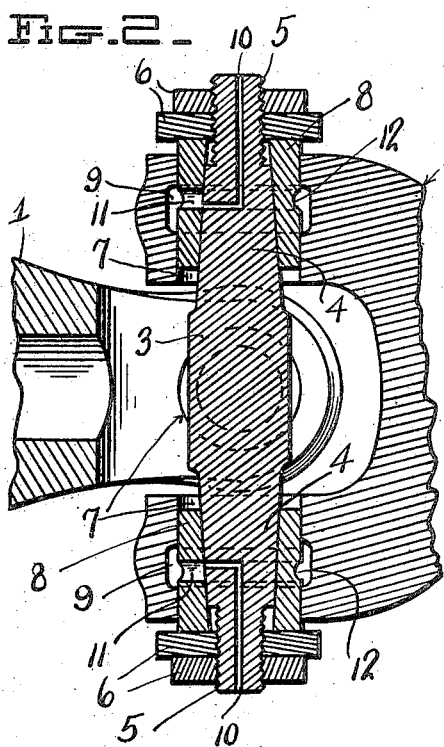
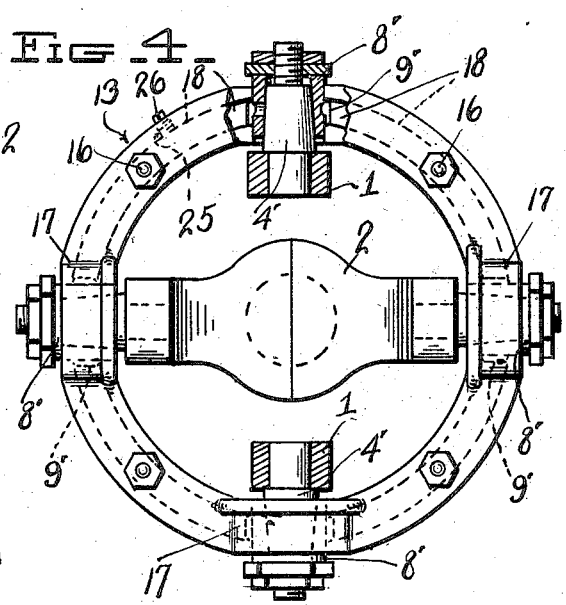
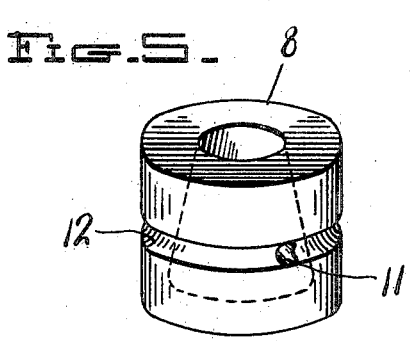
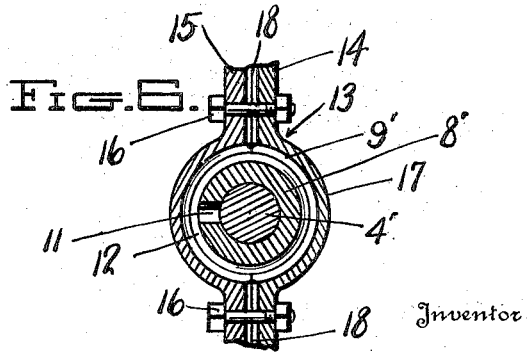
Inventor
Richard A. Hartmann
By L. B. James
Attorney

UNITED STATES PATENT OFFICE.

RICHARD A. HARTMANN, OF HARTFORD, CONNECTICUT, ASSIGNOR TO H. S. & S. MANUFACTURING CO., OF HARTFORD, CONNECTICUT.

UNIVERSAL JOINT.

1,424,299.         Specification of Letters Patent.     Patented Aug. 1, 1922.

Application filed March 10, 1921. Serial No. 451,085.

*To all whom it may concern:*

Be it known that I, RICHARD A. HARTMANN, a subject of Germany, residing at Hartford, in the county of Hartford and State of Connecticut, have invented certain new and useful Improvements in Universal Joints, of which the following is a specification.

This invention relates to improvements in universal joints, the general object of the invention being to provide means for adjusting the parts to take up wear and to prevent play between the parts.

A further object of the invention is to provide means whereby the movable parts will be thoroughly lubricated so as to prevent wear.

A further object of the invention is to so construct and arrange the parts that the joint can be easily and quickly disassembled for the purposes of renewing worn parts or for cleansing the parts.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a side view of a universal joint having its yokes connected by a spider.

Figure 2 is an enlarged sectional view of Figure 1.

Figure 3 is a side view of a universal joint having its yokes connected by a ring.

Figure 4 is a sectional view approximately on line 4—4 of Figure 3.

Figure 5 is a detail view of one of the adjustable bearing sleeves.

Figure 6 is a detail sectional view through a portion of the ring and adjustable bearing sleeve.

In these views 1 indicates one of the yoke members and 2 the other yoke member. In Figures 1 and 2 the members are connected together by the spider 3, the arms of which form the trunnions 4. These trunnions are of tapered shape, as shown and their outer ends are reduced and screw threaded, as at 5, to receive the nuts 6. The trunnions pass through openings 7 in the prongs of the yoke members and adjustable bearing sleeves 8 are placed in said openings, said sleeves having tapered bores to engage the tapered portions of the trunnions. The sleeves are held in position by the nuts 6 on the screw threaded portions 5 and by adjusting the sleeves by said nuts all wear and play between the parts can be taken up.

In order to thoroughly lubricate the parts illustrated in Figs. 1 and 2 I provide an elongated annular pocket 9 in the wall of each opening 7 into which lubricant is introduced by means of the L-shaped port 10 in each trunnion and the port 11 in each sleeve. Each sleeve is also provided with an annular groove 12 with which the port 11 is in communication.

Figures 3, 4 and 6 show the yoke members as being connected together by the ring member 13 which is formed of the two halves 14 and 15 bolted together by the bolts 16. This ring member is provided with the circular enlargements 17 which receive the bearing sleeves 8' and the trunnions 4', said trunnions being formed with or secured to the yoke members.

The lubricating pockets 9' of these circular enlargements are connected together by the conduits 18 formed in the ring member so that lubricant can pass from one pocket to the next. To permit the injection of the lubricant in the ring 13 an aperture 25 is provided therein, said aperture being normally closed by a removable plug 26.

It will be seen that by clamping the two halves of the ring member tightly together the bearing sleeves will be held against movement so that movement is between the trunnions and sleeves. However, if desired the two halves of the ring member need not be so tightly clamped together so that the sleeves can have a certain amount of movement in the circular enlargements.

Figure 4 shows the trunnions as each being formed with a central conical portion and a reduced screw threaded outer end for receiving the nuts and a reduced inner end which is suitably connected with the yoke member. As before explained, however, these trunnions may be formed with the yoke members.

From the above it will be apparent that all wear and play between the parts can be eliminated by tightening the nuts upon the screw threaded portions of the trunnions to force the bearing sleeves inwardly upon the conical portions of the trunnions. It will also be seen that the movable parts are thoroughly lubricated owing to the arrangements of the ports, grooves and elongated pockets.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A joint of the class described comprising a pair of members, one having an opening therein, a trunnion carried by the other member extending into the opening, an adjustable bearing sleeve in the opening engaging the trunnion, the wall of the opening having an elongated pocket therein, the sleeve having an annular groove in communication with the pocket and means for introducing lubricant into the pocket.

2. A joint of the class described comprising a pair of members, one having an opening therein, a trunnion carried by the other member extending into the opening, an adjustable bearing sleeve in the opening engaging the trunnion, the wall of the opening having an elongated pocket therein, the sleeve having an annular groove in communication with the pocket and means for introducing lubricant into the pocket, such means consisting of ports in the trunnion and sleeve.

3. A joint of the class described comprising a pair of yoke members, trunnions carried thereby, each trunnion having a tapered portion and a screw threaded extremity, a ring member having openings therein through which the trunnions pass, bearing sleeves located in the openings and having tapered bores engaging the tapered portions of the trunnions, nuts on the extremities for adjusting the sleeves in the openings, said openings having elongated pockets in their walls, conduits connecting the pockets together and means for introducing lubricant into said pockets.

In testimony whereof I affix my signature.

RICHARD A. HARTMANN.